J. M. GUNN.
GRADING AND SIZING MACHINE.
APPLICATION FILED JUNE 27, 1910.
1,163,910.
Patented Dec. 14, 1915.
2 SHEETS—SHEET 1.
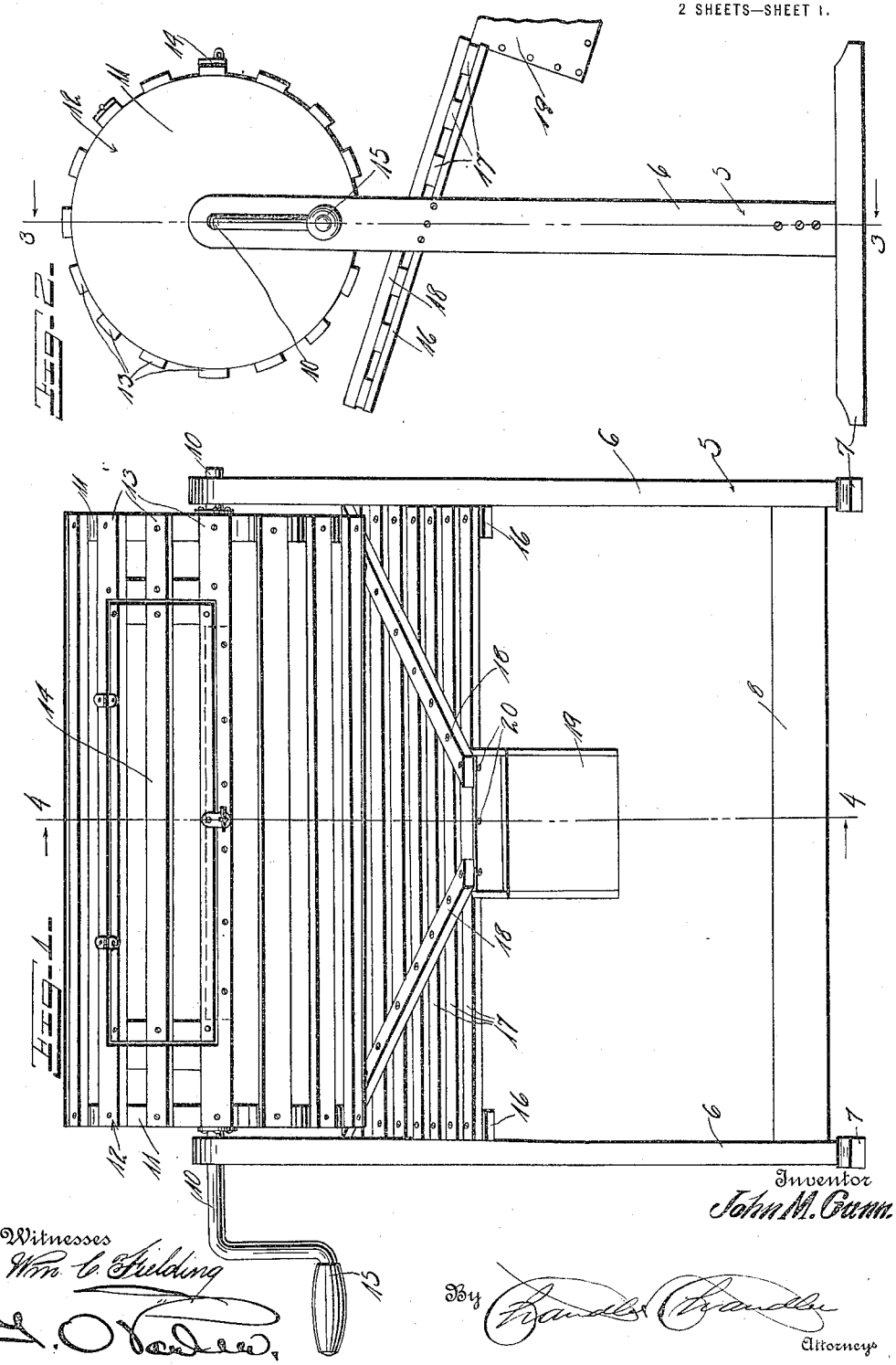
Witnesses
Wm. C. Fielding
Inventor
John M. Gunn.
By
Attorneys

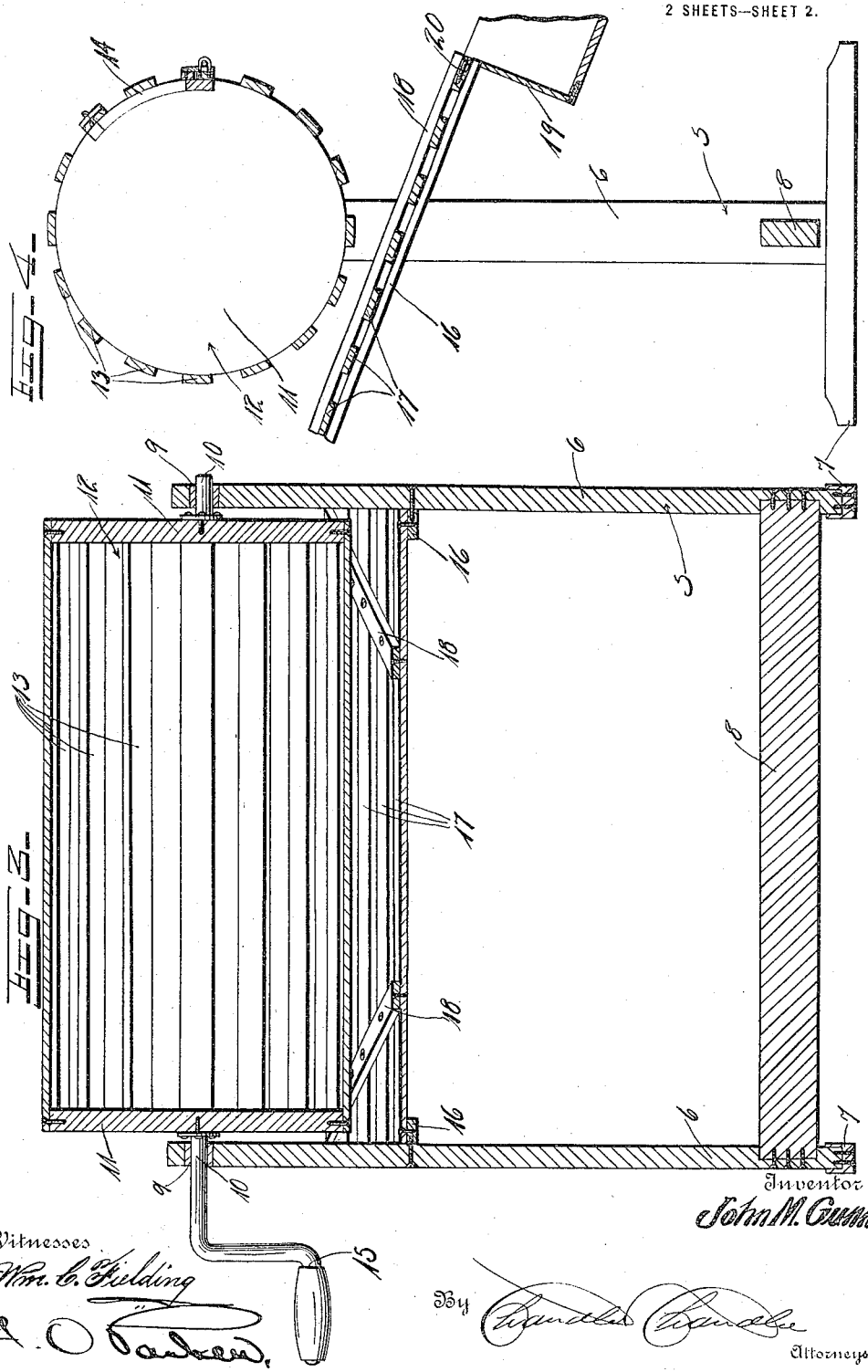

UNITED STATES PATENT OFFICE.

JOHN M. GUNN, OF NEW YORK MILLS, MINNESOTA, ASSIGNOR OF ONE-HALF TO E. R. ROSSER, OF NEW YORK MILLS, MINNESOTA.

GRADING AND SIZING MACHINE.

1,163,910.   Specification of Letters Patent.   Patented Dec. 14, 1915.

Application filed June 27, 1910. Serial No. 569,075.

*To all whom it may concern:*

Be it known that I, JOHN M. GUNN, a citizen of the United States, residing at New York Mills, in the county of Ottertail, State of Minnesota, have invented certain new and useful Improvements in Grading and Sizing Machines; and I do hereby declare the following to be a full, clear, and exact description of the invention, such as will enable others skilled in the art to which it appertains to make and use the same.

The invention relates to a potato separator and more particularly to the class of grading and cleaning machines.

The primary object of the invention is the provision of a machine of this character in which potatoes may be deposited within a revoluble cylinder which latter will discharge the smaller potatoes on to a stationary screen that will remove the sprouts and other foreign matter from the potatoes fed on to the said screen and thereby thoroughly clean the potatoes prior to the depositing thereof into a receptacle.

Another object of the invention is the provision of a machine of this character in which smaller potatoes will be separated from the larger potatoes and at the same time all dirt, sprouts and other foreign matter will be removed from the mass of potatoes prior to the same being deposited within a receiver or the like for consumption or marketing thereof.

A further object of the invention is the provision of a machine of this character in which potatoes and like vegetables will be assorted and cleaned, the same being of easy operation, light, compact and inexpensive in manufacture.

With these and other objects in view the invention consists in the construction, combination and arrangement of parts as will be hereinafter more fully described, illustrated in the accompanying drawings, disclosing the preferred form of embodiment of the invention and pointed out in the claim hereunto appended.

In the drawings:—Figure 1 is a front elevation of a machine constructed in accordance with the invention. Fig. 2 is a side elevation thereof. Fig. 3 is a vertical longitudinal sectional view on the line 3—3 of Fig. 2. Fig. 4 is a transverse section on the line 4—4 of Fig. 1.

Similar reference characters indicate corresponding parts throughout the several views in the drawings.

Referring to the drawings by numerals 5 designates generally the supporting frame work embodying vertical standards or legs 6 the same being provided at their lower ends with feet 7, the legs being joined by a cross brace or beam 8 which is disposed near the lower ends of said legs, the beam 8 and feet 7 being connected in any suitable manner to the legs of the frame work. Suitably mounted near the upper ends of the said legs 6 are bearings 9 in which are journaled trunnions 10 extending outwardly from and fixed to the circular ends or heads 11 of a rotatable assorting cylinder 12, the heads being connected together at their peripheries by means of transverse slats 13 spaced from each other at equi-distances apart so that when potatoes are deposited or delivered within said cylinder 12 the smaller potatoes will discharge through the spaces between said slats while the larger potatoes will be retained within the cylinder. This cylinder 12 is provided with a suitable hinged door 14 whch permits access to be had to the interior thereof and enable potatoes to be deposited or fed within said cylinder. One of the trunnions 10 is extended and terminates in a hand crank 15 whereby the said cylinder 12 may be rotated for assorting the potatoes held thereby. The said cylinder as is obvious is disposed horizontally between the said legs 6 of the frame work.

Fixed to the inner faces of the legs 6 spaced from the lowermost point of the cylinder 12 are forwardly inclined supporting bars 16 to the upper face of which are connected opposite ends of transverse slats 17 the same being spaced at equi-distances apart so that when the smaller potatoes are discharged on to this screen or sifter like platform formed by these slats 17 all dirt, sprouts and other foregin matter will be separated from the said potatoes as they gravitate to the lowermost point on said platform or table, the sprouts and other foreign matter being discharged through the spaces betwen the slats 17 on to the ground.

Suitably fixed to the upper faces of the slats 17 are forwardly converging guide rails 18 which latter serve to direct the potatoes falling upon the platform or screen to a common point thereon for the deposit of the mass into a receptacle or receiver 19 the rear wall of which is fixed to the front edge of the platform or screen by means of fasteners 20 passed through the rear wall and engaging the adjacent slat 17 of the platform or table.

It will be obvious that when the potatoes are discharged from the cylinder 12 on to the platform or table they will by gravitation roll down the inclined platform or table into the receptacle 19 and during the gravitation of the potatoes on the said screen all sprouts and other foreign matter, dirt or the like will be separated therefrom and discharged between the slats on the ground so that the potatoes will be in marketable condition.

What is claimed is:—

In a machine for sorting and cleaning potatoes of different sizes, comprising a pair of standards, a cylinder rotatably mounted on said standards and formed with transverse slats, so spaced as to retain within the cylinder potatoes of a large size and allowing for the discharge of potatoes of a smaller size, an inclined platform disposed below said cylinder and formed with transverse slats, so spaced as to prevent the passage of the smaller potatoes therethrough, the small potatoes being adapted to be cleaned by their engagement one with the other and with the platform slats, during their gravitating movement down the said inclined platform.

In testimony whereof, I affix my signature, in presence of two witnesses.

JOHN M. GUNN.

Witnesses:
E. R. ROSSER,
H. W. ALMQUIST.

Copies of this patent may be obtained for five cents each, by addressing the "Commissioner of Patents, Washington, D. C."